US012594667B2

(12) United States Patent
Yoneyama

(10) Patent No.: US 12,594,667 B2
(45) Date of Patent: Apr. 7, 2026

(54) ROBOT PROGRAMMING DEVICE

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 223 days.

(21) Appl. No.: 18/260,281

(22) PCT Filed: Apr. 9, 2021

(86) PCT No.: PCT/JP2021/015028
§ 371 (c)(1),
(2) Date: Jul. 3, 2023

(87) PCT Pub. No.: WO2022/215253
PCT Pub. Date: Oct. 13, 2022

(65) Prior Publication Data
US 2024/0051123 A1     Feb. 15, 2024

(51) Int. Cl.
*B25J 9/16* (2006.01)
(52) U.S. Cl.
CPC ............. *B25J 9/1605* (2013.01); *B25J 9/163* (2013.01); *B25J 9/1653* (2013.01)
(58) Field of Classification Search
CPC ........ B25J 9/1664; B25J 9/1671; B25J 9/163; B25J 9/1653; B25J 9/1605; G05B 19/42; G05B 2219/40032
See application file for complete search history.

(56) References Cited

U.S. PATENT DOCUMENTS

| | | | |
|---|---|---|---|
| 10,190,873 B1* | 1/2019 | Yamagami | ......... G01B 11/2545 |
| 2010/0211204 A1* | 8/2010 | Zhang | .................... B25J 9/1687 |
| | | | 901/50 |
| 2013/0116822 A1* | 5/2013 | Atohira | .................. B25J 9/1671 |
| | | | 700/255 |

(Continued)

FOREIGN PATENT DOCUMENTS

| | | |
|---|---|---|
| EP | 3321044 A1 | 5/2018 |
| EP | 2843556 B1 | 4/2020 |

(Continued)

OTHER PUBLICATIONS

International Search Report issued in PCT/JP2021/015028; mailed Jun. 29, 2021.

*Primary Examiner* — Stephen Holwerda
(74) *Attorney, Agent, or Firm* — Studebaker Brackett PLLC

(57) ABSTRACT

A robot programming device capable of improving the teaching efficiency of a motion program for a fitting work performed by a robot is provided. This robot programming device includes: a feature acquisition unit for acquiring shape features of a first work object model and a second work object model; a teaching point setting unit for setting, on the basis of the shape features, a teaching point for fitting an axis of the first work object model into a hole of the second work object model by the robot model; and a program creation unit for creating a motion program for the robot to perform fitting work for fitting the axis of the first work object model into the hole of the second work object model, using the set teaching point.

7 Claims, 11 Drawing Sheets

(56) References Cited

U.S. PATENT DOCUMENTS

| | | | | |
|---|---|---|---|---|
| 2013/0197696 A1* | 8/2013 | Nammoto | B25J 9/1633 | |
| | | | | 700/258 |
| 2015/0161808 A1* | 6/2015 | Oya | G05B 19/41885 | |
| | | | | 345/633 |
| 2015/0261899 A1* | 9/2015 | Atohira | B25J 9/1671 | |
| | | | | 703/7 |
| 2017/0235301 A1* | 8/2017 | Atohira | G05B 19/42 | |
| | | | | 700/254 |
| 2018/0257240 A1* | 9/2018 | Hashimoto | A61B 34/37 | |
| 2019/0299350 A1* | 10/2019 | Sakai | B25J 9/1682 | |
| 2020/0023520 A1* | 1/2020 | Yoshizumi | B25J 9/1687 | |
| 2021/0046648 A1* | 2/2021 | Schmitt | B25J 9/1671 | |

FOREIGN PATENT DOCUMENTS

| | | | |
|---|---|---|---|
| JP | H09-330111 A | 12/1997 | |
| JP | H10-124130 A | 5/1998 | |
| JP | 2014-188640 A | 10/2014 | |
| JP | 2015-033745 A | 2/2015 | |
| JP | 2017-140684 A | 8/2017 | |
| JP | 2019-171498 A | 10/2019 | |
| WO | WO-2019162070 A1 * | 8/2019 | B25J 9/1664 |

* cited by examiner

Figure 12:
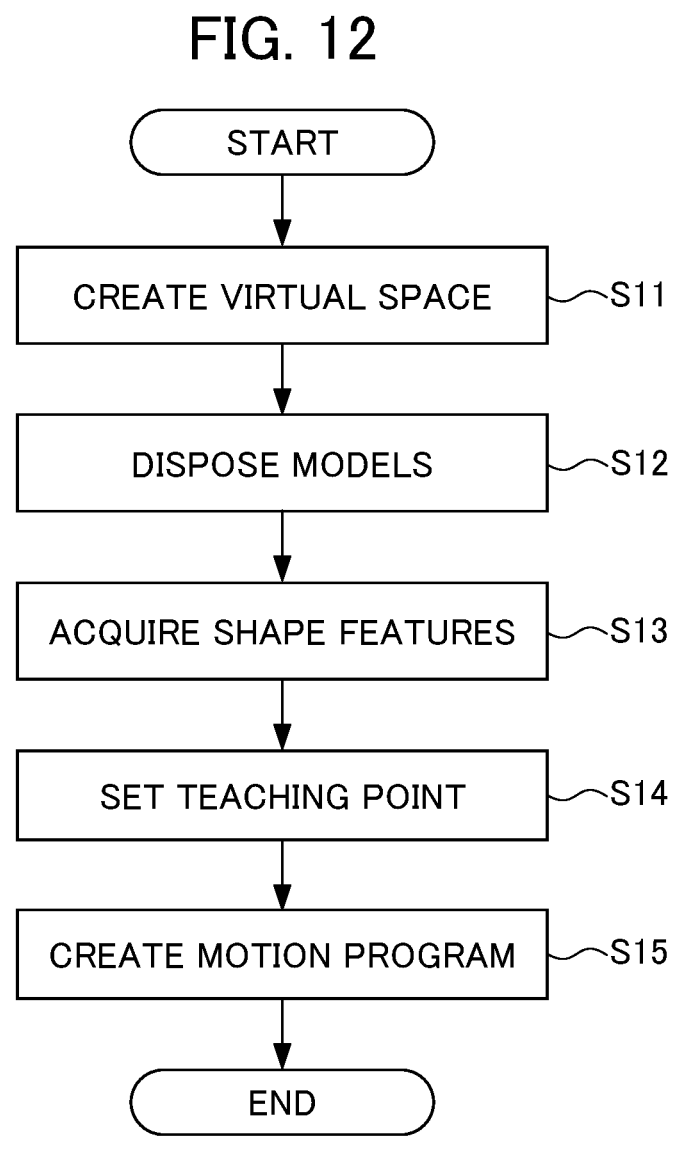

```
            ( START )
                │
                ▼
   ┌──────────────────────────┐
   │   CREATE VIRTUAL SPACE    │──── S11
   └──────────────────────────┘
                │
                ▼
   ┌──────────────────────────┐
   │      DISPOSE MODELS       │──── S12
   └──────────────────────────┘
                │
                ▼
   ┌──────────────────────────┐
   │  ACQUIRE SHAPE FEATURES   │──── S13
   └──────────────────────────┘
                │
                ▼
   ┌──────────────────────────┐
   │    SET TEACHING POINT     │──── S14
   └──────────────────────────┘
                │
                ▼
   ┌──────────────────────────┐
   │  CREATE MOTION PROGRAM    │──── S15
   └──────────────────────────┘
                │
                ▼
            (  END  )
```

ROBOT PROGRAMMING DEVICE

TECHNICAL FIELD

The present invention pertains to a robot programming device.

BACKGROUND ART

Conventionally, in a case of teaching a motion program for work to fit workpieces using a robot, teaching of the motion program is performed while a worker finely adjusts the robot manually such that a shaft belonging to a workpiece grasped by the robot matches a hole that belongs to a target object and is to be fitted into.

Alternatively, in order to teach the motion program, CAD (Computer-Aided Design) models for, inter alia, the robot, a hand, and workpieces are disposed within a virtual space. Teaching of the motion program is performed while a worker finely adjusts the robot manually such that a shaft belonging to a workpiece CAD model grasped by a robot CAD model matches with a hole that belongs to a target object CAD model and is to be fitted into.

On the other hand, a technique for automatically teaching a robot program that pertains to machining such as deburring or welding has been proposed (for example, refer to Patent Document 1).

Patent Document 1: Japanese Unexamined Patent Application, Publication No. 2017-140684

DISCLOSURE OF THE INVENTION

Problems to be Solved by the Invention

However, with the conventional technique, in the fitting work, teaching of the motion program is performed while a worker manually finely adjusts a robot or a CAD model for the robot in a virtual space and thus depends on the proficiency of the worker and requires a long work time. Accordingly, there is a desire to improve the efficiency of teaching a motion program for fitting work that uses a robot.

Means for Solving the Problems

A robot programming device according to one aspect of the present disclosure is provided with: a model disposing unit configured to dispose a robot model for a robot, a first work object model having a shaft, and a second work object model having a hole, within a virtual space that three-dimensionally represents a work space; a feature acquisition unit configured to acquire shape features of the first work object model and the second work object model; a teaching point setting unit configured to, based on the shape features, set a teaching point for using the robot model to fit the shaft belonging to the first work object model into the hole belonging to the second work object model; and a program creation unit configured to use the set teaching point to create a motion program for causing the robot to perform fitting work for causing the shaft belonging to the first work object model to fit into the hole belonging to the second work object model.

Effects of the Invention

By virtue of the present invention, it is possible to improve the efficiency of teaching a motion program for fitting work that uses a robot.

BRIEF DESCRIPTION OF THE DRAWINGS

FIG. 7 is a view for illustrating regarding setting a teaching point for getting closer and a teaching point for moving away;

FIG. 12 a flow chart for illustrating processing by a robot programming device.

PREFERRED MODE FOR CARRYING OUT THE INVENTION

Figure 1:
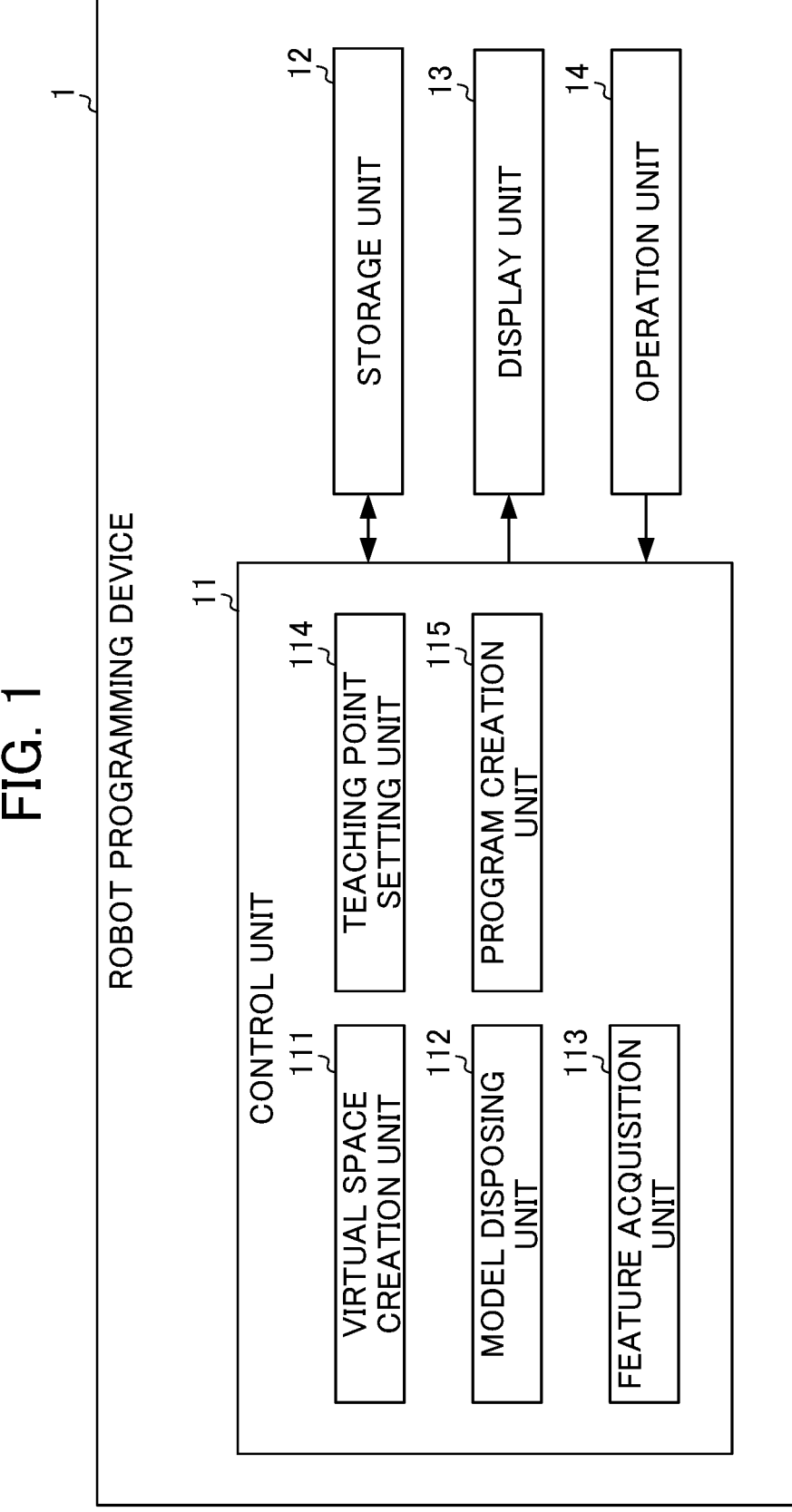
FIG. 1 is a block view that illustrates a configuration of a robot programming device according to the present embodiment.

Description is given below regarding an example of an embodiment according to the present invention. FIG. 1 is a block view that illustrates a configuration of a robot programming device 1 according to the present embodiment. As illustrated in FIG. 1, the robot programming device 1 is provided with a control unit 11, a storage unit 12, a display unit 13, and an operation unit 14. One objective for the robot programming device 1 is to teach a motion program for a robot that is provided with a tool for machining a workpiece disposed within a work space.

The control unit 11 is a processor such as a CPU (Central Processing Unit), and realizes various functions by executing a program stored in a storage unit 23. The control unit 11 is provided with a virtual space creation unit 111, a model disposing unit 112, a feature acquisition unit 113, a teaching point setting unit 114, and a program creation unit 115.

The storage unit 12 is a storage apparatus such as a ROM (Read-Only Memory) for storing, inter alia, an OS (Operating System) or an application program, a RAM (Random-Access Memory), or a hard disk drive or an SSD (Solid-State Drive) for storing various other items of information.

The storage unit 12, for example, stores CAD (Computer-Aided Design) model data pertaining to, inter alia, a later-described robot model 20, a hand model 30, a first work object model 40 for a first work object, and a second work object model 50 for a second work object.

The display unit 13 is configured by, inter alia, an LCD (Liquid Crystal Display) or a CRT (Cathode Ray Tube), and displays various images. The operation unit 14 is configured by, inter alia, a mouse or a keyboard, and accepts various inputs.

Figure 2:
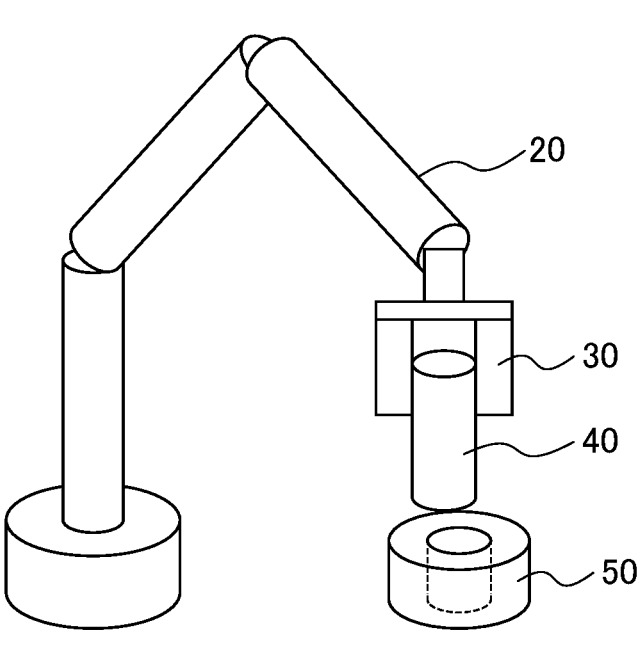
FIG. 2 is a view that illustrates a robot model, a hand model, a first work object model, and a second work object model in a virtual space.

The virtual space creation unit 111 creates a virtual space that three-dimensionally represents the work space. FIG. 2 is a view that illustrates the robot model 20, the hand model 30, the first work object model 40, and the second work object model 50 in the virtual space.

As illustrated in FIG. 2, the model disposing unit 112 disposes, in the virtual space, the robot model 20 for the robot, the hand model 30 for a robot hand, the first work object model 40 which is for a first work object that has a shaft, and the second work object model 50 which is for a second work object that has a hole.

Specifically, based on the CAD model data stored in the storage unit 12, the model disposing unit 112 disposes the robot model 20, the hand model 30, the first work object model 40, and the second work object model 50 within the virtual space. Note that, in the example illustrated in FIG. 2, the first work object model 40 is grasped by the robot model 20, and the second work object model 50 is immobilized.

Based on, inter alia, CAD model data for the first work object model 40 and the second work object model 50, the feature acquisition unit 113 acquires shape features of the first work object model 40 and the second work object model 50.

Based on the shape features acquired by the feature acquisition unit 113, the teaching point setting unit 114 sets a teaching point for causing the shaft belonging to the first work object model 40 to be fitted into the hole belonging to the second work object model 50 by the robot model 20.

The program creation unit 115 uses the teaching point set by the teaching point setting unit 114 to creates a motion program for causing the robot to perform fitting work for causing the shaft belonging to the first work object model 40 to fit into the hole belonging to the second work object model 50.

Figure 3A:
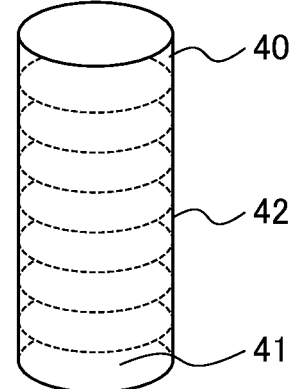
FIG. 3A is a view that illustrates a configuration of the first work object model.

FIG. 3A is a view that illustrates a configuration of the first work object model 40. As illustrated in FIG. 3A, the first work object model 40 is provided with an elliptical cylinder having an elliptical bottom surface. In other words, the first work object model 40 has a shaft shape, and the shapes of cross-sections 41 when the first work object model 40 is cut in a direction parallel to the bottom surface thereof are uniform elliptical shapes.

The feature acquisition unit 113 acquires, as shape features, a plurality of first ridgelines 42 in cross-sections 41 resulting from dividing the shaft belonging to the first work object model 40 at predetermined intervals.

Figure 3B:
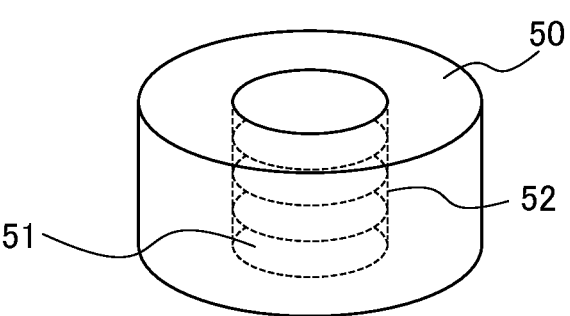
FIG. 3B is a view that illustrates a configuration of the second work object model.

FIG. 3B is a view that illustrates a configuration of the second work object model 50. As illustrated in FIG. 3B, the second work object model 50 is provided with an elliptical cylinder shape having an elliptical bottom surface, and has a hole in the center thereof. The shapes of cross-sections 51 for when the hole belonging to the second work object model 50 is cut in a longitudinal direction are uniform elliptical shapes. Note that the hole belonging to the second work object model 50 is a through hole.

The feature acquisition unit 113 acquires, as shape features, a plurality of second ridgelines 52 in cross-sections 51 resulting from dividing the hole belonging to the second work object model 50 at predetermined intervals.

In addition, upon acquiring the first ridgelines 42 and the second ridgelines 53, the feature acquisition unit 113 confirms that the first ridgelines 42 for respective cross-sections 41 of the first work object model 40 match second ridgelines 52 for respective cross-sections 51 of the second work object model 50.

Figure 3C:
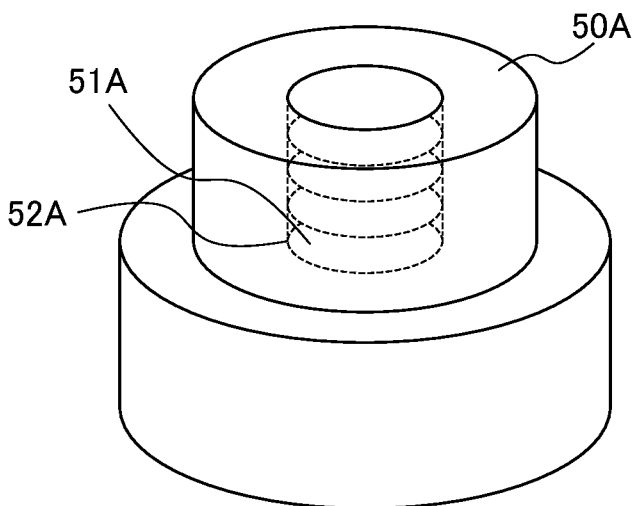
FIG. 3C is a view that illustrates a configuration of the second work object model.

FIG. 3C is a view that illustrates a configuration of a second work object model 50A. As illustrated in FIG. 3C, the second work object model 50A is provided with a shape resulting from stacking elliptical cylinder shapes having elliptical bottom surfaces, and has a hole in the center thereof.

The hole belonging to the second work object model 50A does not go through, but the feature acquisition unit 113 acquires, as shape features, a plurality of second ridgelines 52A for cross-sections 51A resulting from dividing the hole belonging to the second work object model 50A at predetermined intervals.

Figure 4A:
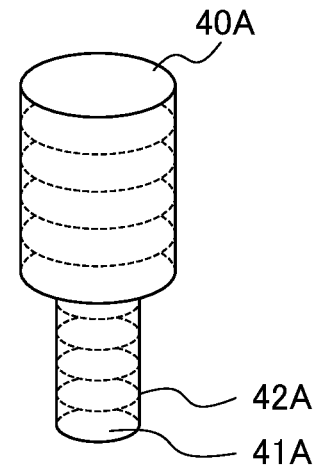
FIG. 4A is a view that illustrates a configuration of the first work object model.

FIG. 4A is a view that illustrates a configuration of a first work object model 40A. As illustrated in FIG. 4A, the first work object model 40A is provided with a shape resulting from stacking elliptical cylinders having elliptical bottom surfaces. In this case, the feature acquisition unit 113 acquires, as shape features, a plurality of first ridgelines 42A in cross-sections 41A resulting from dividing the shaft belonging to the first work object model 40A at predetermined intervals.

Figure 4B:
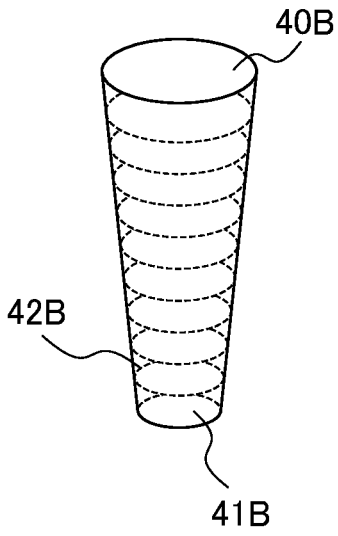
FIG. 4B is a view that illustrates a configuration of the first work object model.

FIG. 4B is a view that illustrates a configuration of a first work object model 40B. As illustrated in FIG. 4B, the first work object model 40B has an elliptical bottom surface, and a tapered shape. In this case, the feature acquisition unit 113 acquires, as shape features, a plurality of first ridgelines 42B in cross-sections 41B resulting from dividing the shaft belonging to the first work object model 40B at predetermined intervals.

Figure 4C:
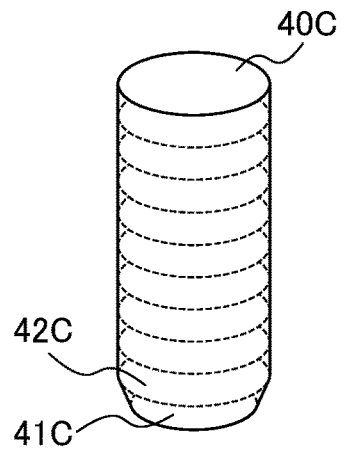
FIG. 4C is a view that illustrates a configuration of the first work object model.

FIG. 4C is a view that illustrates a configuration of a first work object model 40C. As illustrated in FIG. 4C, the first work object model 40C is an elliptical cylinder having an elliptical bottom surface, and chamfering near the bottom surface. In this case, the feature acquisition unit 113 acquires, as shape features, a plurality of first ridgelines 42C in cross-sections 41C resulting from dividing the shaft belonging to the first work object model 40C at predetermined intervals.

Figure 5:
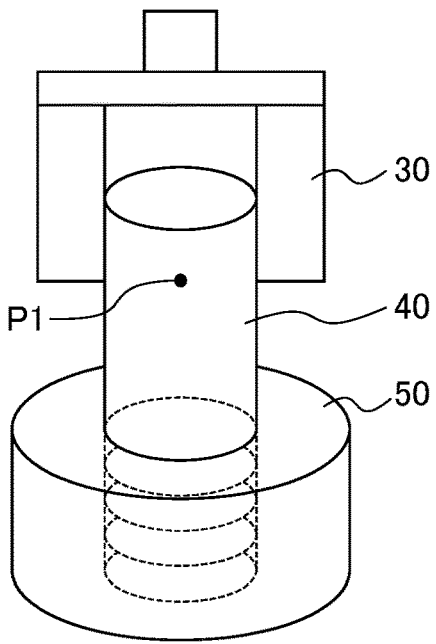
FIG. 5 is a view for illustrating regarding setting of a teaching point.

FIG. 5 is a view for illustrating regarding setting of a teaching point P1. As illustrated in FIG. 5, the teaching point setting unit 114 sets a teaching point P1 for fitting work to a position resulting from moving the robot model 20 such that the first ridgelines 42 match with the second ridgelines 52. The teaching point P1 is set to a tool tip point belonging to the hand model 30, for example.

In addition, the teaching point setting unit 114 checks for interference between the shaft belonging to the first work object model 40 and the hole belonging to the second work object model 50 at the teaching point P1, and confirms that the shaft belonging to the first work object model 40 and the hole belonging to the second work object model 50A completely match at the teaching point P1. Note that the shaft belonging to the first work object model 40 and the hole belonging to the second work object model 50A at the teaching point P1 have the same shape and essentially do not interfere.

Figure 6A:
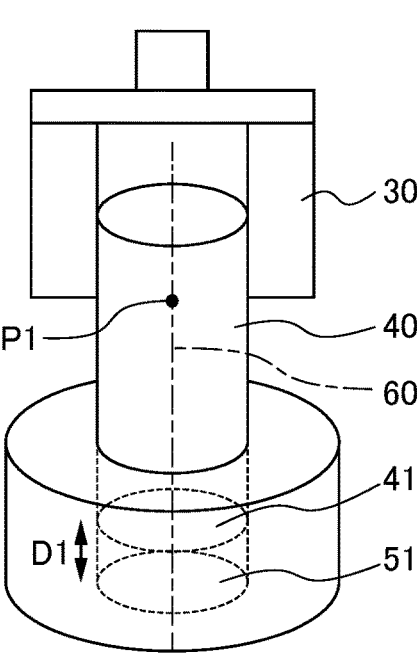
FIG. 6A is a view for illustrating regarding setting of the teaching point.

FIG. 6A is a view for illustrating regarding setting of the teaching point P1. As illustrated in FIG. 6A, the teaching point setting unit 114 may set a distance offset D1 for fitting in a straight-line direction that goes through a center 60 for the shaft belonging to the first work object model 40 and the hole belonging to the second work object model 50. As a result, the teaching point setting unit 114 can set the teaching point P1 in a state where the shaft belonging to the first work object model 40 is caused to float with respect to the hole belonging to the second work object model 50.

Figure 6B:
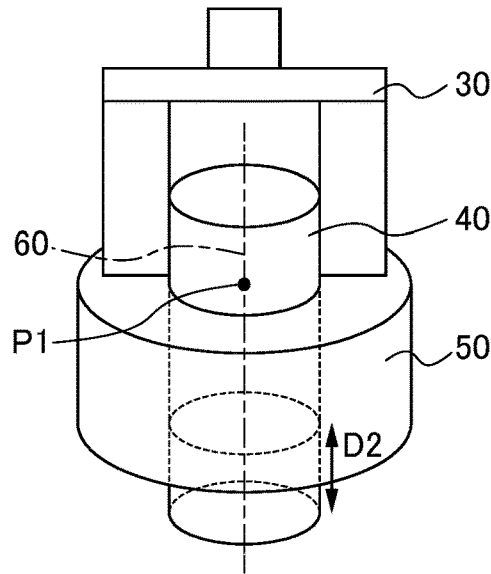
FIG. 6B is a view for illustrating regarding setting of the teaching point.

FIG. 6B is a view for illustrating regarding setting of the teaching point P1. As illustrated in FIG. 6B, the teaching point setting unit 114 may set a distance offset D2 for fitting in a straight-line direction that goes through a center 60 for the shaft belonging to the first work object model 40 and the hole belonging to the second work object model 50. As a result, the teaching point setting unit 114 can set the teaching point P1 in a state where the shaft belonging to the first work object model 40 has penetrated through the hole belonging to the second work object model 50.

Figure 7:
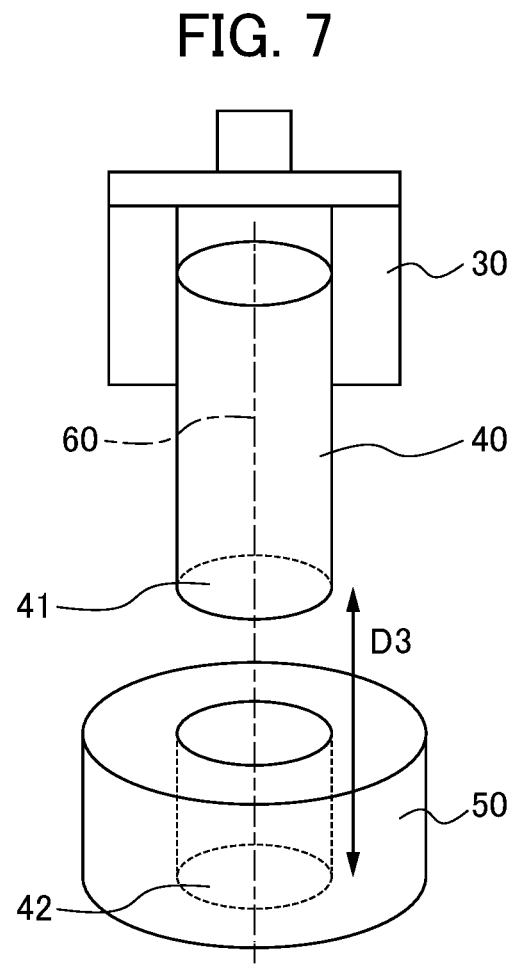

FIG. 7 is a view for illustrating regarding setting a teaching point for getting closer and a teaching point for moving away. As illustrated in FIG. 7, the teaching point setting unit 114 may set a distance offset D3 for getting closer and moving away in a straight-line direction that goes through a center 60 for the shaft belonging to the first work object model 40 and the hole belonging to the second work object model 50.

The teaching point setting unit 114 sets the teaching point for getting closer and the teaching point for moving away at positions resulting from causing the robot model 20 to move in a straight-line direction that goes through the center 60. Specifically, as illustrated in FIG. 7, the teaching point setting unit 114 sets the teaching point for getting closer and the teaching point for moving away at positions such that a cross-section 41 and a cross-section 51 are separated by the distance offset D3.

Accordingly, after the teaching points have been set, the motion program causes the robot model 20 to move in the order of the teaching point for getting closer, the teaching point for fitting work, and the teaching point for moving away.

Figure 8A:
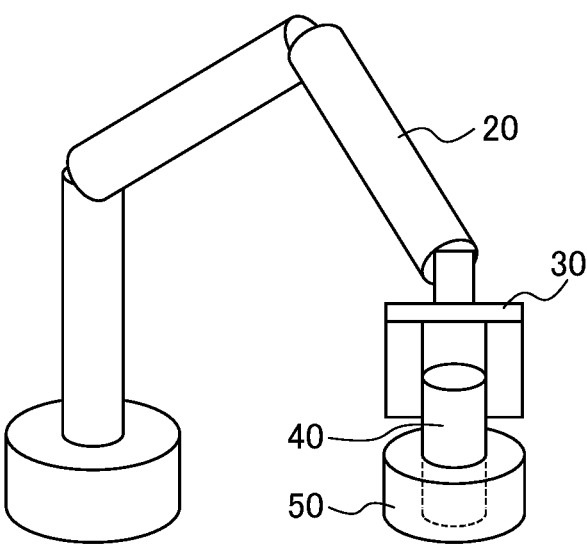
FIG. 8A is a view that illustrates an example of a case where a robot model has a plurality of postures.
Figure 8B:
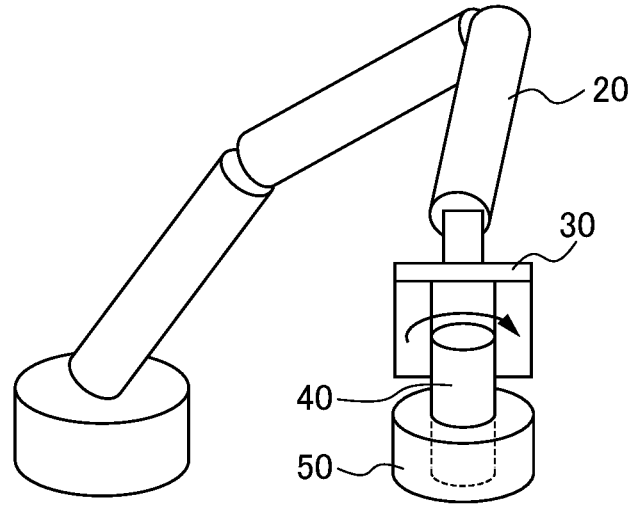
FIG. 8B is a view that illustrates an example of a case where a robot model has a plurality of postures.

FIG. 8A and FIG. 8B are views that illustrate an example of a case where the robot model 20 has a plurality of postures. In the case where the cross-sectional shapes of the shaft belonging to the first work object model 40 and the hole belonging to the second work object model 50 are elliptical, the robot model 20 can take a posture resulting from reversing the orientation of the first work object model 40 by 180°, as illustrated in FIG. 8B. In other words, the robot model 20 can take a plurality of postures at the teaching point P1 for fitting.

In this manner, in a case where there is a plurality of postures that the robot model 20 can take at the teaching point P1, the teaching point setting unit 114 selects and sets one posture from among the plurality of postures. Specifically, the teaching point setting unit 114 selects and sets a posture having the least change to the posture of the robot model 20.

Figure 9A:
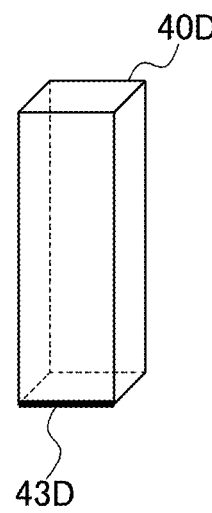
FIG. 9A is a view that illustrates an example of a case where a robot model has a plurality of postures.
Figure 9B:
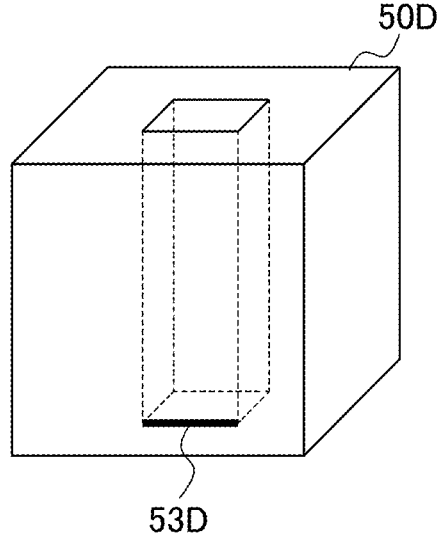
FIG. 9B is a view that illustrates an example of a case where a robot model has a plurality of postures.

FIG. 9A and FIG. 9B are views that illustrate an example of a case where the robot model 20 has a plurality of postures. As illustrated in FIG. 9A and FIG. 9B, in a case where cross-sectional shapes of a shaft belonging to a first work object model 40D and a hole in a second work object model 50D are squares, the robot model 20 can take four postures resulting from rotating the orientation of the first work object model 40 by 90° at a time.

In this case, the teaching point setting unit 114 selects and sets a posture having the least change to the posture of the robot model 20. In addition, the teaching point setting unit 114 may select and set a posture resulting from causing the robot model 20 to move, such that a designated edge on a terminal end surface 43D belonging to the first work object model 40D matches a designated edge on a terminal end surface 53D belonging to the second work object model 50D.

Figure 10:
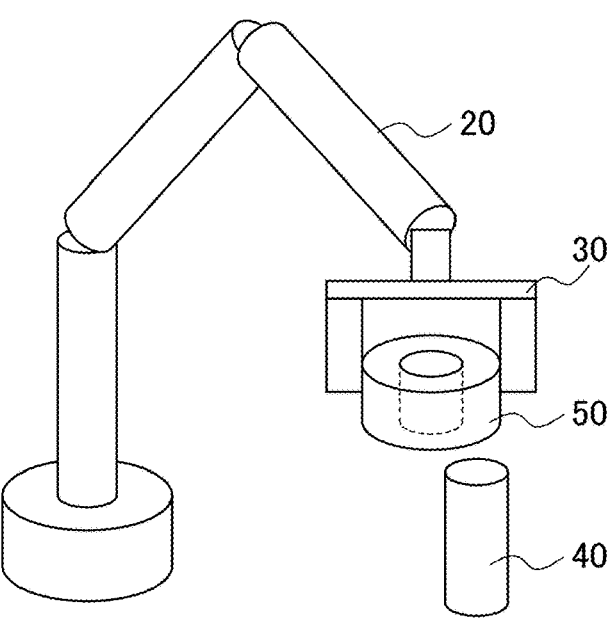
FIG. 10 is a view that illustrates another example of a configuration of a robot model, a hand model, a first work object model, and a second work object model in a virtual space.

FIG. 10 is a view that illustrates another example of a configuration of the robot model 20, the hand model 30, the first work object model 40, and the second work object model 50 in a virtual space. As illustrated in FIG. 10, it may be that the first work object model 40 is immobilized and the second work object model 50 is grasped by the robot model 20. This case is also similar to the example described above and, based on the shape features, the teaching point setting unit 114 can set a teaching point for causing the shaft belonging to the first work object model 40 to be fitted into the hole belonging to the second work object model 50 by the robot model 20.

Figure 11:
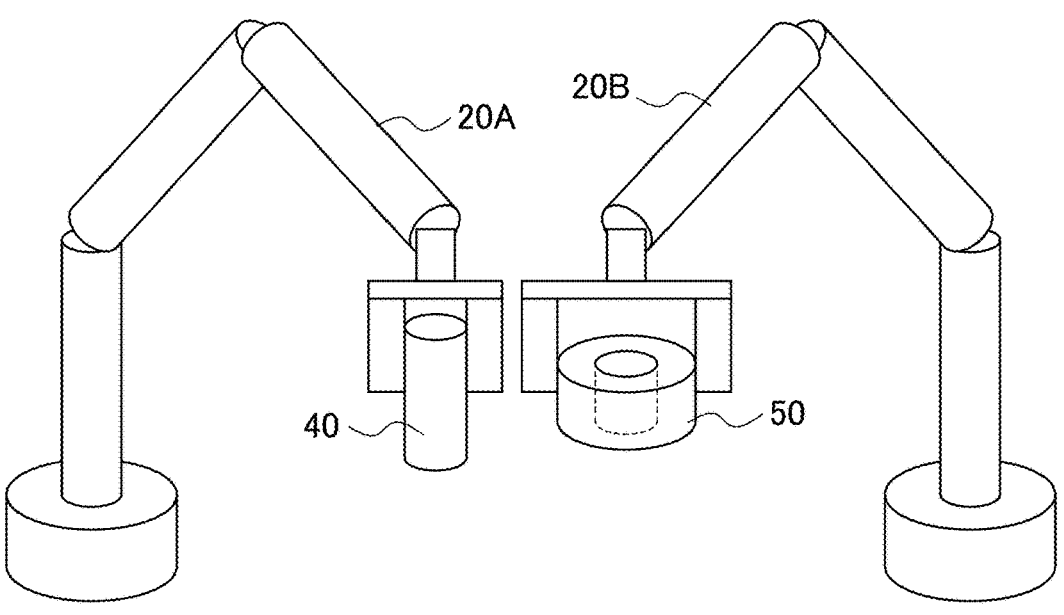
FIG. 11 is a view that illustrates an example of a configuration for a case of having two robot models in a virtual space.

FIG. 11 is a view that illustrates an example of a configuration for a case of having two robot models 20A and 20B in a virtual space. As illustrated in FIG. 11, the model disposing unit 112 disposes the robot models 20A and 20B, which are for two robots, in the same virtual space. The two robot models 20A and 20B respectively grasp the first work object model 40 and the second work object model 50.

This case is also similar to the example described above and, based on the shape features, the teaching point setting unit 114 can set a teaching point for causing the shaft belonging to the first work object model 40 to be fitted into the hole belonging to the second work object model 50 by the robot models 20A and 20B.

FIG. 12 a flow chart for illustrating processing by the robot programming device 1. In Step S11, the virtual space creation unit 111 creates a virtual space that three-dimensionally represents a work space.

In Step S12, the model disposing unit 112 disposes, in the virtual space, the robot model 20 for the robot, the hand model 30 for a robot hand, the first work object model 40 which is for a first work object that has a shaft, and the second work object model 50 which is for a second work object that has a hole.

In Step S13, the feature acquisition unit 113 acquires shape features of the first work object model 40 and the second work object model 50.

In Step S14, based on the shape features, the teaching point setting unit 114 sets a teaching point for causing the shaft belonging to the first work object model 40 to be fitted into the hole belonging to the second work object model 50 by the robot model 20.

In Step S15, the program creation unit 115 uses the set teaching point to creates a motion program for causing the robot to perform fitting work for causing the shaft belonging to the first work object model 40 to fit into the hole belonging to the second work object model 50.

By virtue of the present embodiment, the robot programming device 1 is provided with: the virtual space creation unit 111 that creates a virtual space that three-dimensionally represents a work space; the model disposing unit 112 that disposes, within the virtual space, the robot model 20 which is for a robot, the hand model 30 which is for a robot hand, the first work object model 40 which is for a first work object and has a shaft, and the second work object model 50 which is for a second work object having a hole; the feature acquisition unit 113 that acquires shape features of the first work object model 40 and the second work object model 50; the teaching point setting unit 114 that, based on the shape features, sets a teaching point for using the robot model 20 to fit the shaft belonging to the first work object model 40 into the hole belonging to the second work object model 50; and the program creation unit 115 that uses the set teaching point to create a motion program for causing the robot to perform fitting work for causing the shaft belonging to the first work object model 40 to fit into the hole belonging to the second work object model 50.

As a result, the robot programming device 1 can automatically generate a motion program for a robot that performs fitting work. Accordingly, the robot programming device 1 can significantly reduce the load and amount of work time resulting from the conventional approach of manually performing teaching while a worker manually finely adjusts a robot or a CAD model for the robot in a virtual space.

In addition, the feature acquisition unit 113 acquires, as shape features, a plurality of first ridgelines for cross-sections resulting from dividing the shaft belonging to the first work object model 40 at predetermined intervals and a plurality of second ridgelines for cross-sections resulting from dividing the hole belonging to the second work object model 50 at predetermined intervals. The teaching point setting unit 114 sets a teaching point to a position resulting from moving the robot model 20 such that the first ridgelines match with the second ridgelines. As a result, the robot programming device 1 can automatically generate, with good accuracy, a teaching point for fitting in a motion program for a robot that performs fitting work.

The teaching point setting unit 114 sets a teaching point for getting closer and the teaching point for moving away at positions resulting from causing the robot model 20 to move in a straight-line direction that goes through the centers of the cross-sections of the shaft and the hole. As a result, the robot programming device 1 can automatically generate, with good accuracy, a teaching point for getting closer and a teaching point for moving away, in a motion program for a robot that performs fitting work.

In addition, in a case where there is a plurality of postures that the robot model 20 can take at the teaching point, the teaching point setting unit 114 selects and sets one posture from among the plurality of postures. As a result, the robot programming device 1 can automatically generate a teaching point for a posture appropriate for the robot model 20.

In addition, it may be that the first work object model 40 is grasped by the robot model 20 and the second work object model 50 is immobilized. In addition, it may be that the first work object model 40 is immobilized and the second work object model 50 is grasped by the robot model 20. As a result, the robot programming device 1 can generate a motion program in a state in which one of the first work object model 40 and the second work object model 50 is immobilized and the other is grasped by the robot model 20.

In addition, the model disposing unit 112 disposes the robot models 20A and 20B, which are for two robots, in a virtual space. The two robot models 20A and 20B respectively grasp the first work object model 40 and the second work object model 50. As a result, the robot programming device 1 can use the two robot models 20A and 20B to generate a motion program.

In addition, the model disposing unit 112 disposes the hand model 30 for a hand belonging to the robot in a virtual space together with the robot model 20. As a result, the robot programming device 1 can automatically generate a teaching point for a posture appropriate for the hand model 30.

Description was given above regarding embodiments of the present invention, but the robot programming device 1 described above can be realized by hardware, software, or a combination of these. A control method performed by the robot programming device 1 described above can be realized by hardware, software, or a combination of these. Being realized by software means being realized by a computer reading and executing a program.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a hard disk drive), a magneto-optical recording medium (for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a random-access memory (RAM)).

Each embodiment described above is a suitable embodiment of the present invention, but the scope of the present invention is not limited to only the embodiments described above, and the present invention can be worked in forms resulting from making various modifications within a range that does not deviate from the substance of the present invention.

EXPLANATION OF REFERENCE NUMERALS

1 Robot programming device
11 Control unit
12 Storage unit
13 Display unit
14 Operation unit
111 Virtual space creation unit
112 Model disposing unit
113 Feature acquisition unit
114 Teaching point setting unit
115 Program creation unit
The invention claimed is:

1. A robot programming device, comprising:
a processor,
wherein the processor is configured to:
be capable of disposing a robot model for a robot, a first work object model having a shaft, and a second work object model having a hole, within a virtual space that three-dimensionally represents a work space;
acquire shape features of the first work object model and the second work object model;
based on the shape features, set a teaching point for using the robot model to fit the shaft belonging to the first work object model into the hole belonging to the second work object model; and
use the set teaching point to create a motion program for causing the robot to perform fitting work for causing the shaft belonging to the first work object model to fit into the hole belonging to the second work object model,
wherein the processor acquires, as the shape features, a plurality of first ridgelines for cross-sections resulting from dividing the shaft belonging to the first work object model at predetermined intervals and a plurality of second ridgelines for cross-sections resulting from dividing the hole belonging to the second work object model at predetermined intervals, and wherein the processor sets the teaching point to a position resulting from causing the robot model to move such that the first ridgelines match with the second ridgelines.

2. The robot programming device according to claim 1, wherein the processor, in a case where there is a plurality of postures that the robot model can take at the teaching point, selects and sets one posture from among the plurality of postures.

3. The robot programming device according to claim 1, wherein the first work object model is grasped by the robot model, and the second work object model is immobilized.

4. The robot programming device according to claim 1, wherein the first work object model is immobilized, and the second work object model is grasped by the robot model.

5. The robot programming device according to claim 1, wherein the processor disposes robot models for two robots within the virtual space, and the two robot models respectively grasp the first work object model and the second work object model.

6. The robot programming device according to claim 1, wherein the processor disposes, within the virtual space and together with the robot model, a hand model for a hand belonging to the robot.

7. A robot programming device, comprising:

a processor, wherein the processor is configured to:

be capable of disposing a robot model for a robot, a first work object model having a shaft, and a second work object model having a hole, within a virtual space that three-dimensionally represents a work space;

acquire shape features of the first work object model and the second work object model;

based on the shape features, set a teaching point for using the robot model to fit the shaft belonging to the first work object model into the hole belonging to the second work object model; and use the set teaching point to create a motion program for causing the robot to perform fitting work for causing the shaft belonging to the first work object model to fit into the hole belonging to the second work object model, wherein the processor acquires, as the shape features, a plurality of first ridgelines for cross-sections resulting from dividing the shaft belonging to the first work object model at predetermined intervals and a plurality of second ridgelines for cross-sections resulting from dividing the hole belonging to the second work object model at predetermined intervals, and wherein the processor sets a teaching point for getting closer and a teaching point for moving away at positions resulting from moving the robot model in a straight-line direction that goes through centers of cross-sections of the shaft and the hole.

* * * * *